Aug. 16, 1960 K. ADCOCK 2,949,064
TOOL FOR ROUGHENING WALLS OF BOWLING BALL FINGER HOLES
Filed Sept. 15, 1958
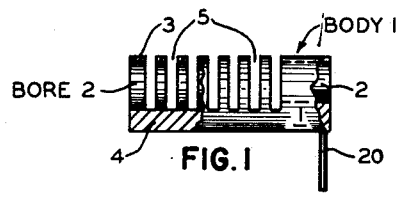
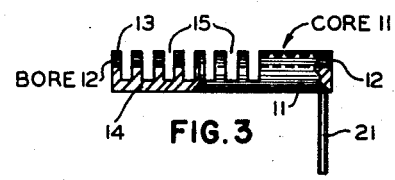
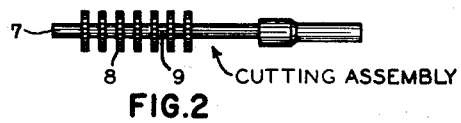
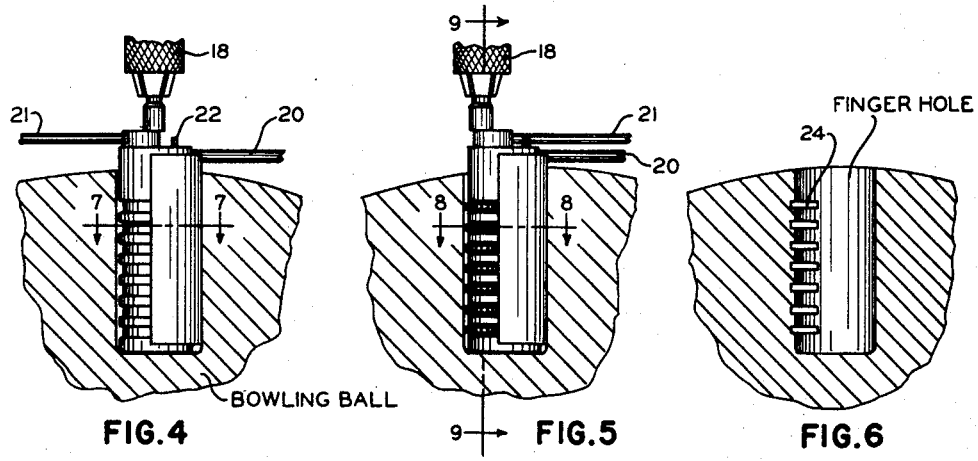
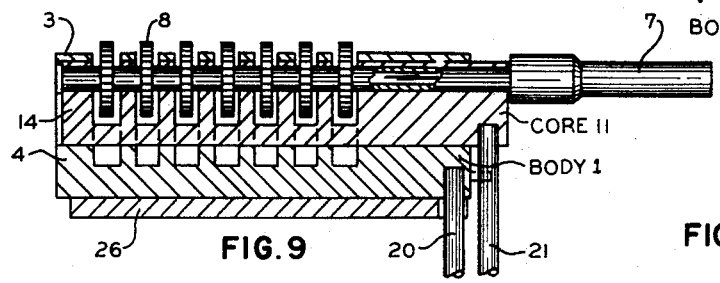
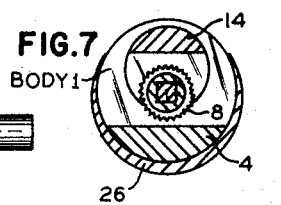
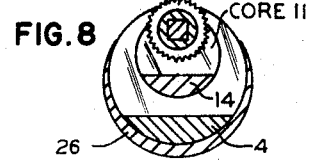
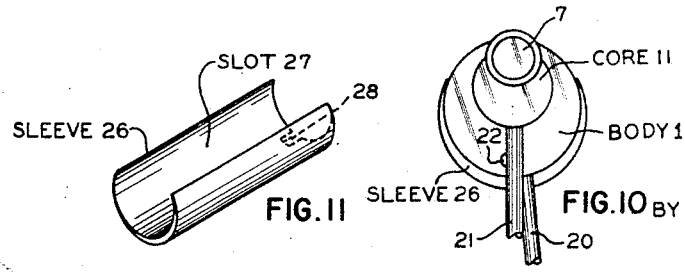
INVENTOR
KENNETH ADCOCK
BY Arthur H. Robert
ATTORNEY

United States Patent Office 2,949,064
Patented Aug. 16, 1960

2,949,064

TOOL FOR ROUGHENING WALLS OF BOWLING BALL FINGER HOLES

Kenneth Adcock, Box 213, R.R. #1, Jeffersonville, Ind.

Filed Sept. 15, 1958, Ser. No. 761,123

4 Claims. (Cl. 90—12)

As noted in the Berghorn U.S. Patent No. 2,640,518, the walls of bowling ball finger holes tend to become so smooth during use as to interfere with the player's grip on and control of the ball. It is therefore, desirable to roughen these walls and tools for that purpose have heretofore been proposed. The present invention relates to a tool of this character.

The principal object of this invention is to provide a substantially improved tool for roughening the walls of bowling ball finger holes and, more particularly, to provide a small, simple, compact, sturdy and workman-like tool which is easy to insert into the finger hole of a bowling ball, easyt o operate, quick and effective in operation and easy to remove.

Another important object of this invention is to provide a tool which adequately roughens the wall quicker, better and more easily than the tools heretofore proposed.

Further objects of this invention are: to provide a tool, which may be readily driven by a mechanical power source, such as a power drill; and to provide one for cutting a series of uniformly spaced serrations which are of a precisely controlled depth and which leave interposed square-edged ribs providing an effective gripping surface.

Broadly speaking, my invention resides in the provision of a tool comprising: an elongate cylindrical body having a longitudinal bore and a transverse slot extending radially across the bore and opening outwardly through the periphery; a cutting assembly including an elongate rotatable shaft and a cutting wheel mounted on that shaft for rotation therewith; and means mounting the shaft of the assembly longitudinally in the bore for transverse movement bodily from an inoperative position, wherein the shaft and cutting wheel are wholly confined within said body, to a cutting position, wherein a chord-like portion of said cutting wheel transversely projects outwardly beyond the peripheral confines of said body. With this arrangement, the cylindrical body, with its inoperatively positioned cutting assembly, may be partially inserted endwise into the finger hole of a bowling ball, the uninserted projecting end of the shaft connected to a power driven tool to rotate the cutting wheel and the mounting of the shaft manipulated to move the rotating cutting wheel toward its transversely projecting operative position and thereby cause it to cut into the wall of the finger hole. Now, by turning the tool as a unit within the finger hole, this cut can be extended arcuately along that wall to form a serration of desired angular extent.

A tool embodying my invention is illustrated in the accompanying drawing wherein:

Figs. 1–3 are partly broken side elevational views of the cylindrical body, the cutting assembly and the mounting means respectively;

Figs. 4 and 5 are fregmentary enlarged sectional views taken through the finger hole of a bowling ball and showing the tool in elevation with the cutter assembly in its inoperative and operative positions respectively;

Fig. 6 is a fragmentary sectional view of a ball showing its finger hole after the roughening operation;

Fig. 7 is an enlarged transverse section taken along lines 7—7 of Fig. 4;

Fig. 8 is an enlarged transverse section taken along lines 8—8 of Fig. 5;

Fig. 9 is an enlarged longitudinal section taken along lines 9—9 of Fig. 5;

Fig. 10 is a right end view of the tool as it appears in Fig. 9; and

Fig. 11 is a perspective view of a sleeve used to adapt the tool for operation in a finger hole of larger diameter.

The tool illustrated in the drawing comprises the following elements: (1) a cylindrical body; (2) a cutting assembly; (3) means mounting the cutting assembly on the body; (4) means to drive the cutting assembly; (5) means to move the assembly between its operative and inoperative positions; (6) means to turn the tool angularly as a unit; and (7) means to adapt the tool for use in finger holes of larger diameter.

*Cylindrical body*

The body member is in the form of an elongate cylinder or cylindrical body 1 dimensioned for endwise insertion into and removal from a bowling ball finger hole. This body 1 preferably should have a snug fit within the hole but the tolerance should be such as to enable it to be inserted and removed with ease. The cylinder or cylindrical body 1 has a longitudinal or axially extending bore 2 passing from one end to the other.

The bore 2 preferably is eccentrically located within the body 1 so as to be separated from the periphery of the body 1 on one side by a thin wall 3 and on the opposite side by a relatively thick wall 4, it being understood, that the thickness of the wall around the bore normally will increase in a progressive manner from the thin side 3 to the thick side 4. The body 1 also has a series of transversely extending slots 5, each passing entirely through the thin wall 3, entirely across the bore 2 and partly through the thick wall 4.

*Cutting assembly*

The cutting assembly includes an elongate rotatable shaft 7 which is much smaller in diameter than the bore 2 but substantially longer in length, and a series of cutting wheels 8 mounted on the shaft 7 for rotation therewith, there being one cutting wheel 8 in the cutting assembly for each slot 5 in the cylindrical body 1. The cutting wheels 8 are spaced along the shaft in accordance with the spacing of the slots 5 in body 1; hence, the shaft 7 carries suitable spacers 9.

*Cutting assembly mounting means*

The cutting assembly is mounted on the body 1 for transverse movement between an inoperative and operative positions. In the inoperative position, indicated in Fig. 7, the entire cutting assembly is wholly confined within body 1, the shaft 7 and spacers 9 extending longitudinally through the bore 2 along one side thereof with each cutting wheel 8 so positioned as to extend wholly within its slot 5 and also partly within bore 2, the remainder projecting transversely from bore 2 toward the thick wall 4.

When bodily moved to its operative position, indicated in Figs. 5, 8 and 9, the cutting assembly is wholly confined within the body 1 except for a chord-like portion of each wheel which projects outwardly beyond the periphery of the body 1. Now the shaft 7 and spacers 9 continue to extend longitudinally through the bore 2 along the opposite side thereof with each cutting wheel 8 so positioned that it not only extends partly within its slot 5, its outwardly projecting chord-like part extending outwardly beyond such slot, but also extends partly within bore 2, the remaining part, which includes the chord-like part, projecting outwardly from the bore 2 on the thin wall 3 side of the bore.

Any suitable means may be employed for mounting the cutting assembly for movement between its operative and inoperative positions. In the structure illustrated, the means used comprises a cylindrical core 11 dimensioned to fit snugly within the bore 2. The core 11 has an eccentric bore 12 for receiving the shaft 7 of the cutting assembly, thin and thick walls 13 and 14, and a series of transverse slots 15 for accommodating the cutting wheels 8 of the cutting assembly. The slots 15 are cut through the cylindrical core 11 of the mounting means in the same way as slots 5 were cut through the cylindrical body 1. In other words, core 11 is a smaller scaled reproduction of the cylindrical body 1 since both members are of circular outer cross-section, both have an eccentric bore and both have transverse slots which are cut through the thin wall side of the cylinder entirely across the bore and partially into the thick wall side of the cylinder.

Cutting assembly drive

To drive the cutting assembly, its shaft 7 is arranged to project outwardly from one end of the tool and adapted for connection in an endwise manner with the drive end 18 of a suitable power tool or drill press.

Assembly positioning means

In order to position the cutting assembly in its inoperative and operative positions, the body 1 and core 11 are provided with crank handles 20, 21. Thus the body 1 is made of a length such that its outer end will project from the finger hole into which the tool is inserted and its projecting periphery is provided with a radially extending handle 20. Similarly, the outer end of the core 11 is made to project endwise from the outer end of the body 1 and its projecting periphery is provided with a radially extending handle 21. These handles preferably are spaced more or less diametrically apart in the inoperative position of the tool as seen in Fig. 4 and relatively adjacent to each other in the operative position thereof as seen in Fig. 5. By swinging these handles rotationally toward each other, the core 11 will be angularly moved within the eccentric bore of body 1 causing the cutting assembly to be moved arcuately from its inner inoperative position to its outer operative position. It will be appreciated that, if the tool is inserted into a snug fit within a finger hole, the cutting wheels 8, in moving out of the inoperative position, can reach the outer operative cutting position only by cutting a recess into the wall of the finger hole to the extent that the cutting wheels project outwardly from the periphery of the cutting tool.

To limit the outward movement of the cutting wheels, a stop 22 is provided on the end face of the outer end of body 1 in position to engage the handle 21 after it has been swung toward handle 20 to a desired extent, which is to say, through a predetermined angle. The provision of this stop insures that the recess cut by the wheels 8 will be of a predetermined depth. Now, if that recess is to be angularly lengthened into an arcuate serration 24, the tool, as a unit, must be angularly turned within the finger hole.

Tool turning means

During this operation, the crank handles 20, 21 do not move relatively to each other but, on the contrary, move as a unit with the tool and thereby cause the tool to extend the recess arcuately over any desired angle ranging from a few degrees to a complete circle.

Adapter means

Bowling ball holes vary in diameter. Thus a tool of the character illustrated, having a given outside diameter, may be satisfactorily used in holes of larger dimension over a given range. For a still larger range of holes, it is desirable to use an adapter which forces the tool to occupy an offset position along one side of the hole. This can be done by interposing a strip of metal of suitable thickness between an axial section of the outer peripheral surface of the tool and a corresponding section of the wall of the finger hole.

It is more adequately accomplished by using a sleeve 26 dimensioned to fit snugly around the periphery of the tool, this sleeve having an axial slot 27 to accommodate the movement of the cutting wheels to their operative position and a wall thickness preferably increasing from the slot progressively around the tool to a point diametrically opposite the axial slot. In other words, the adapter sleeve 26 is of crescent shape in cross-section. The sleeve 26 should not move relatively to the body 1. It should move angularly therewith and, to this end, is provided with a notch 28 to receive the handle 20 and thereby latch these parts against relative movement.

Operation

The tool 1 is preferably manipulated to its inoperative position and mounted in the chuck 18 of a vertical drill press, not shown. The adapter sleeve 26 is used if required by the diameter of the finger hole. A bowling ball is placed on the drill press table, not shown, and one of its finger holes is vertically aligned with the roughening tool. The drill press is operated to insert the tool endwise into the finger hole to a desired position and then locked in such position.

The diametrically spaced crank handles 20, 21 are now swung, in spaced relationship, to place the tool in a desired angular position within the finger hole whereupon the core handle 21 is moved toward the body handle 20 thereby causing the rotating wheels 8 to bite into the bore wall of the finger hole. When handle 21 engages stop 22, then both handles 20 and 21 are swung to turn the tool, as a unit, angularly within the finger hole and thereby form a series of serrations 24. The cutting wheels 8 may now be retracted into the body 1 and the tool raised out of the finger hole.

Having described my invention, I claim:

1. A tool for roughening the bore wall of a finger hole in a bowling ball, comprising: an elongate body member adapted for endwise insertion into and removal from said hole and having a longitudinally extending eccentric bore; an elongate cylindrical core member journaled in said bore for partial rotation about the center axis thereof and also having a longitudinally extending eccentric bore; the opposite sides of the eccentric bore of each member being separated from its periphery by relatively thick and thin walls; each member also having a correspondingly located transverse slot passing entirely through its thin wall and bore and partly through its thick wall; a cutting assembly including an elongate shaft rotationally journaled in said core bore for rotary movement about the center axis thereof and a cutting wheel located in said slots and mounted on said shaft for rotation therewith about the center of said core bore; means for partially rotating said core within said body so as to move said cutting assembly bodily along an arcuate path from an inoperative position, wherein said cutting wheel is wholly confined within said body, to an operative position, wherein a chord-like portion of said cutting wheel transversely projects outwardly beyond the peripheral confines of said body on the thin wall side thereof; and means for rotating said cutting assembly relatively to said core and body members.

2. The tool of claim 1 wherein: each member includes a series of said corresponding transverse slots spaced longitudinally along it; and a corresponding series of said cutting wheels located in said slots and mounted on said shaft for rotation therewith.

3. The tool of claim 1 wherein: the means for moving the cutting assembly from one position to another comprises one crank handle connected to the body and another handle connected to the core.

4. The tool of claim 3 wherein: said handles also provide a means for partially rotating the tool, including said body and core members, as a unit.

References Cited in the file of this patent

UNITED STATES PATENTS

| | | |
|---|---|---|
| 2,166,923 | Woodcock | July 18, 1939 |
| 2,467,030 | Harrington | Apr. 12, 1949 |
| 2,583,429 | Johnson | Jan. 22, 1952 |